Patented Nov. 24, 1936

2,061,551

UNITED STATES PATENT OFFICE 2,061,551

DISAZODYESTUFFS

Heinrich Clingestein, Cologne, and Werner Petzold and Ludwig Hauck, Leverkusen, Germany, assignors to General Aniline Works, Inc., New York, N. Y., a corporation of Delaware No Drawing. Application July 5, 1935, Serial No. 30,014. In Germany August 2, 1934

3 Claims. (Cl. 260—83)

The present invention relates to new substantive disazodyestuffs, more particularly it relates to azodyestuffs which may be represented by the probable general formula

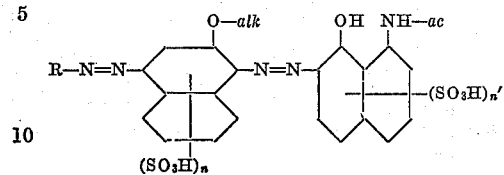

wherein R stands for the radical of a diazotized monoaminodiphenyl compound, *alk* stands for an alkyl group, *ac* stands for a non-diazotizable acyl group, $n$ stands for one of the numbers 0 and 1, and $n'$ stands for one of the numbers 1 and 2.

Our new dyestuffs are obtainable by coupling the diazo compounds of aminodiphenyl compounds with 1-amino-2-naphthol alkyl ethers or their sulfonic acids, diazotizing the aminoazodyestuffs obtained and coupling with non-diazotizable 1-acylamino-8-naphtholsulfonic acids. Our new dyestuffs are in form of their alkali metal salts generally dark green substances, soluble in water, dyeing cellulosic fibres in general clear green to bluish-green shades, and some of them are suitable for dyeing viscose, leather, paper, jute and the like.

The invention is illustrated by the following examples, but is not restricted thereto.

(1) 24.9 parts by weight of 4-aminodiphenyl-3-sulfonic acid are diazotized with 6.9 parts by weight of sodium nitrite and hydrochloric acid and coupled in acetic acid solution with 28.9 parts by weight of 1-amino-2-ethoxynaphthalene-6-sodium sulfonate. When the coupling is complete, the solution is neutralized with aqueous caustic soda lye, and then 6.9 parts by weight of sodium nitrite, and subsequently 75 parts by weight of aqueous hydrochloric acid of 30% strength are added. The diazotization is complete after stirring for a short time at 30–33° C. The diazo compound precipitated is filtered with suction, suspended in water and added to a solution alkaline with sodium bicarbonate of 42.3 parts by weight of 1-benzoylamino-8-naphthol-3,6-disulfonic acid containing pyridine. The isolated dyestuff having in its free state the following formula

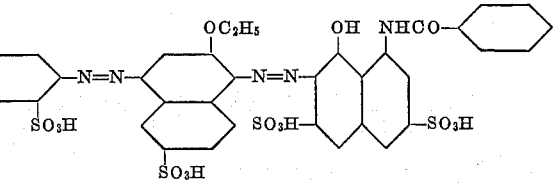

dyes cotton and viscose clear green shades.

Instead of 1-benzoylamino-8-naphthol-3,6-disulfonic acid there can be used 1-acetylamino-8-naphthol-4-sulfonic acid, 1-acetylamino-8-naphthol-6-sulfonic acid or 1-benzoyl- or -acetyl-amino-8-naphthol-4,6-disulfonic acid, and instead of 1-amino-2-ethoxynaphthalene-6-sulfonic acid there can be used the corresponding methyl ether or 1-amino-2-naphtholalkyl ethers containing no sulfonic acid group. In all cases there are obtained dyestuffs of similar properties.

(2) 24.9 parts by weight of 2-aminodiphenyl-5-sulfonic acid are diazotized with 6.9 parts by weight of sodium nitrite and hydrochloric acid and coupled in acetic acid solution with 26.7 parts by weight of 1-amino-2-ethoxynaphthalene-6-sulfonic acid. When the coupling is complete the monoazodyestuff is salted out from the solution which has been neutralized with aqueous caustic soda lye. The isolated dyestuff is dissolved in water with the addition of a small quantity of aqueous caustic soda lye, to the solution 6.9 parts by weight of sodium nitrite are added and then the cold solution is rendered acid to Congo red with hydrochloric acid. The diazo compound obtained is salted out, isolated, suspended in water and added to a solution alkaline with bicarbonate of 36.1 parts by weight of 1-acetylamino-8-naphthol-3,6-disulfonic acid containing pyridine. The isolated dyestuff having in its free state the following formula

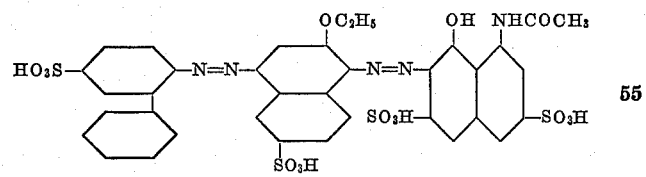

dyes cotton bluish-green shades.

By substituting the 1-amino-2-ethoxynaphthalene-6-sulfonic acid by the corresponding methyl-ether or by 1-amino-2-ethoxy- (or -methoxy-) naphthalene and/or the 1-acetylamino-8-naphthol-3,6-disulfonic acid by 1-acetylamino- (or 1-propionylamino-, or 1-chloroacetylamino or 1-benzoylamino-) 8-naphthol-4-sulfonic acid (or -2,4 disulfonic acid) there are obtained dyestuffs exerting similar properties.

We claim:

1. Disazodyestuffs of the general formula

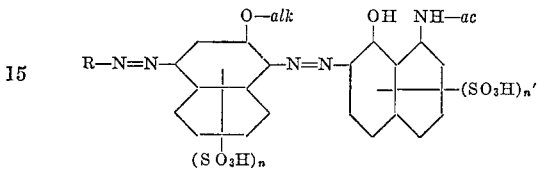

wherein R stands for the radical of a diazotized monoaminodiphenyl compound, alk stands for an alkyl group, ac stands for a non-diazotizable acyl group, n stands for one of the numbers 0 and 1, and n' stands for one of the numbers 1 and 2, being in form of their alkali metal salts generally dark green substances, soluble in water, dyeing cellulosic fibres in general clear green to bluish-green shades.

2. Disazodyestuffs of the general formula

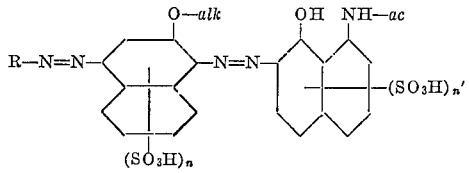

wherein R stands for the radical of a diazotized monoaminodiphenyl compounds, alk stands for a member of the group consisting of methyl and ethyl, ac stands for a member of the group consisting of acetyl and benzoyl, n stands for one of the numbers 0 and 1, and n' stands for one of the numbers 1 and 2, being in form of their alkali metal salts generally dark green substances, soluble in water, dyeing celelulosic fibres in general clear green to bluish-green shades.

3. The azodyestuff having in its free state the following formula

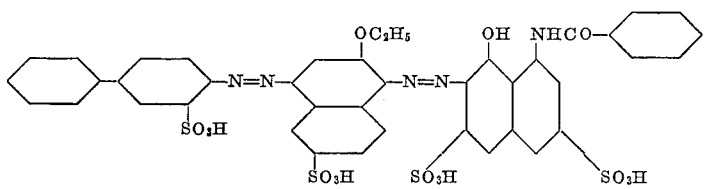

dyeing cotton and viscose clear green shades.

HEINRICH CLINGESTEIN.
WERNER PETZOLD.
LUDWIG HAUCK.